May 16, 1967   R. L. HARTUNG   3,319,469
MULTIBED SAMPLER FOR PARTICULATE SOLIDS
Filed Nov. 27, 1964   4 Sheets-Sheet 1

INVENTOR
RODERICK L. HARTUNG
BY
ATTORNEYS

INVENTOR
RODERICK L. HARTUNG
ATTORNEYS

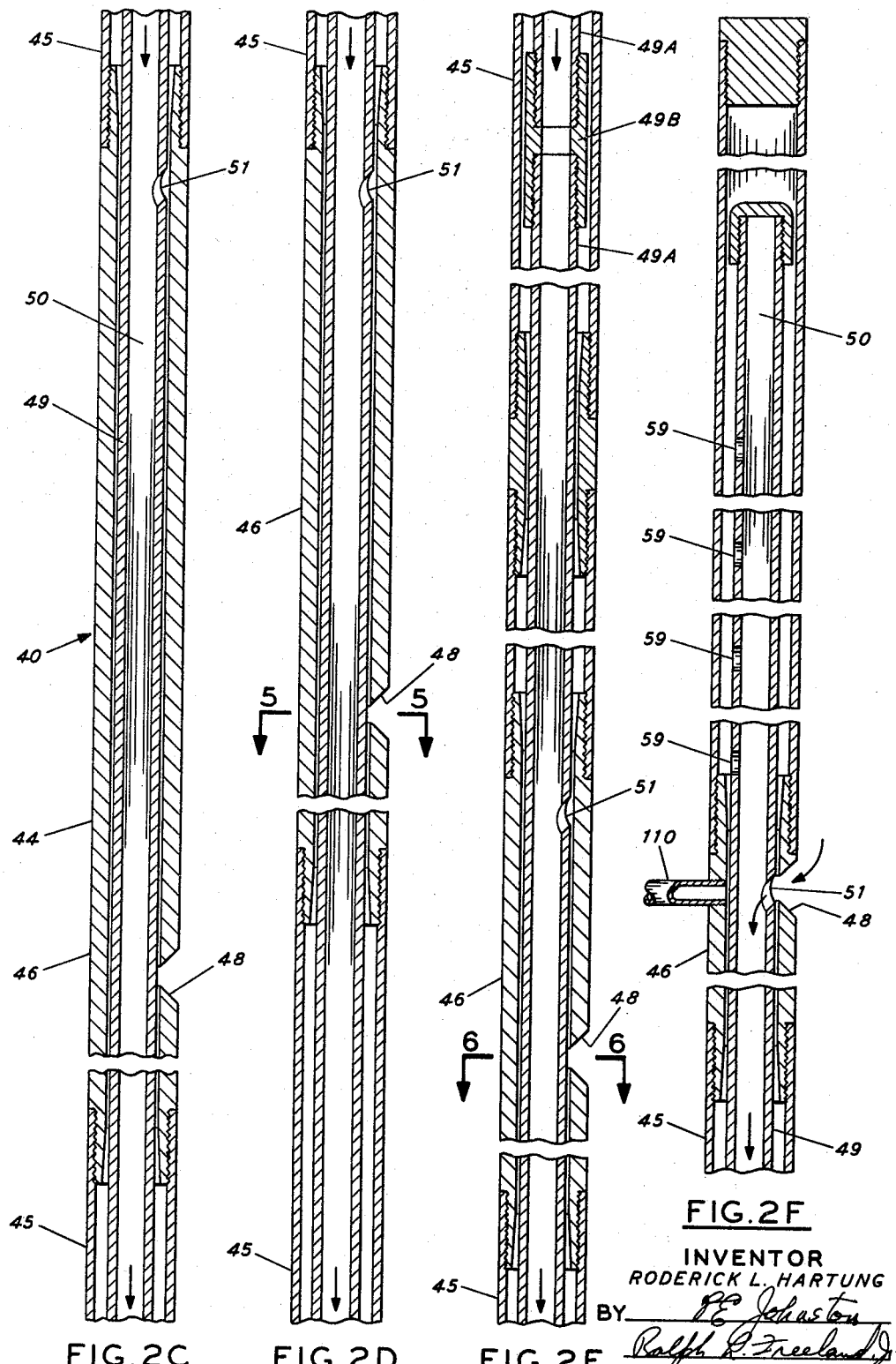

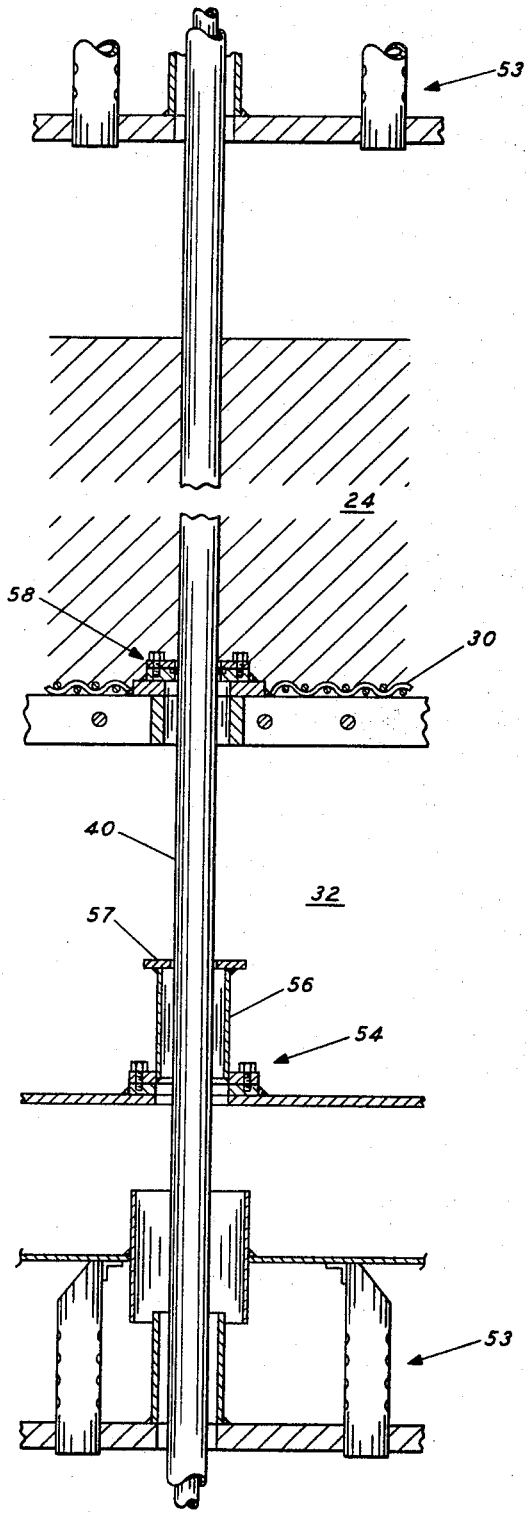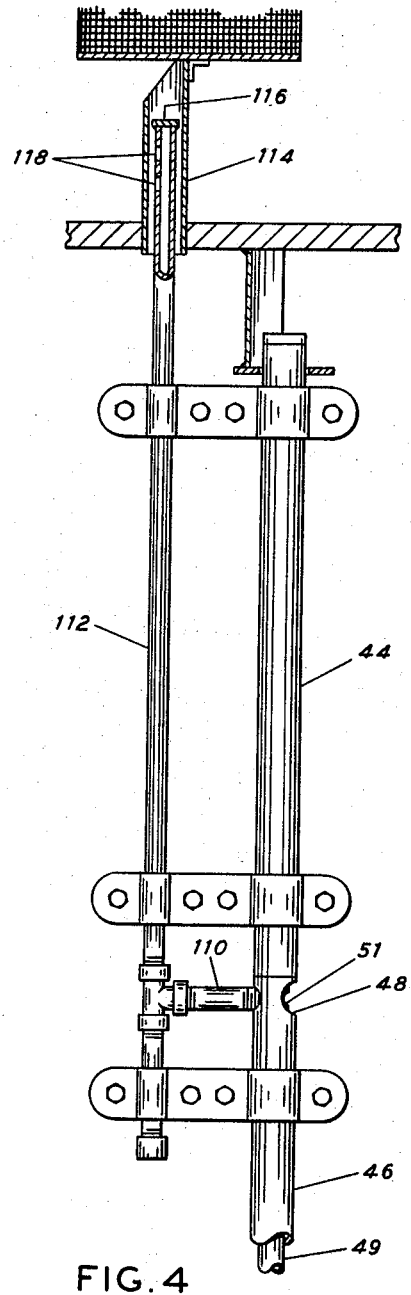
FIG.3
FIG.4
INVENTOR
RODERICK L. HARTUNG
BY
ATTORNEYS 3,319,469
MULTIBED SAMPLER FOR PARTICULATE SOLIDS
Roderick L. Hartung, Pinole, Calif., assignor to Chevron Research Company, a corporation of Delaware
Filed Nov. 27, 1964, Ser. No. 414,264
6 Claims. (Cl. 73—421)

The present invention relates to catalyst samplers. More particularly, it relates to a device for safely withdrawing samples of particulate material, like catalyst, from any of a plurality of levels, or beds, in a reaction vessel that is operating under nonatmospheric conditions without altering conditions in the vessel.

The invention has for an object providing a catalyst sampling device for selectively withdrawing a sample of catalyst from any one of a plurality of vertically separated catalyst beds in an elongated reaction vessel. It includes an elongated probe that forms a sample chamber and has a plurality of intake ports, or openings, that can be connected with a complementary plurality of intake ports formed in a surrounding, elongated tube. Both probe and tube extend through an end wall of the reaction vessel so that they pass through the various levels, or beds, of catalyst. The probe member is moved longitudinally, or slidably, within the surrounding tube, to align selectively, and one at a time, an intake port in the probe with a corresponding intake opening in the tube. When one pair of intake ports in the tube and the probe are in register, a withdrawal, or discharge port at the bottom of the probe, which is exterior to the vessel, is effectively sealed by a surrounding housing that is an external extension of the surrounding tube. This permits a catalyst sample from the selected bed to enter the probe without altering conditions in the reaction vessel. The probe member is then moved longitudinally within the surrounding tube and housing to a position where all of the intake ports in the vessel are out of register. Upon further movement of the probe, the discharge port in the probe registers with a discharge port in the external housing. The sample can thus be withdrawn to a separate, closed chamber that is isolated from atmospheric conditions. In this way the sample may be tested before it has been altered by exposure to atmospheric conditions.

Catalyst samplers according to the present invention are particularly adapted to withdraw particles from vessels that have several different fixed beds, each operating at temperature or pressure conditions that differ from atmospheric. In particular, a sampler constructed in accordance with this invention has been found useful in hydroformer and hydrocracker vessels where the reactions are carried out in fixed catalyst beds. In this type of system, fluids under treatment flow through a succession of such fixed beds that are located one above the other in a unitary, high pressure reaction vessel. Such a system is closed and normally operates without cyclic regeneration of the catalyst for many hundreds of hours.

It has been known heretofore that catalyst samples can be withdrawn from a vessel having a single catalyst bed in a closed system. It is also known to use a plurality of probes to withdraw a sample from a similar plurality of beds. But, it has not been possible before this invention to examine catalyst for deterioration of activity, contamination and the like at any one bed, selected from a group of fixed beds with a single, elongated sampling device. This is particularly desirable so that minimum obstructions to flow of fluids are placed in the reaction vessel and to simplify the design of high pressure vessels.

For the foregoing reasons, it is desirable that the means for selectively withdrawing catalyst particles from any one of a sample provide a plurality of catalyst beds during the time hydrocarbons are reacting with the catalyst but without interfering with the continuity of operation in the vessel. Because a multiple, fixed bed reaction vessel may be on the order of 50 to 100 feet long, and because it is important that the probe have a minimum diameter, previously known forms of samplers are not reliable over periods of many months. The best form of such known samplers includes an isolatable chamber that is operated by rotation of a probe within a housing. When the unit is only a few inches (1–3) in diameter and "fines" (comminuted catalyst particles) lodge between the probe and housing, rotation of the probe can be difficult or impossible, particularly after extended periods of use.

In a preferred form of apparatus for carrying out this invention, the sampler comprises an elongated tube that extends upwardly through an end wall of the reaction vessel so that it passes through each catalyst level or bed. The elongated tube has at least one intake port in the side wall at each spaced bed. This tube is also secured to an end wall of the reaction vessel and forms a pressure-type connection through the vessel wall. An elongated probe member that is hollow to form a sample receiving and holding chamber then extends substantially through the elongated tube. The probe has intake ports adapted to be brought into registry with complementary intake ports in the tube at each of the levels. The probe also has one discharge port in the portion that extends beyond the end wall of the reaction vessel. This portion of the probe is also enclosed so that a catalyst sample is transferred from the selected bed to a receiver outside the vessel without contacting the atmosphere. In the preferred form of apparatus, a single outlet port in the probe engages one of a plurality of discharge ports formed in the external housing. The probe moves longitudinally, or axially, in the tubing member between the selected intake and discharge positions so that the intake and outlet ports pass through a neutral, or closed, position. In this position, both the intake and discharge ports are closed to isolate the sample from the selected bed in the probe chamber until the probe moves axially to either the intake or outlet positions relative to the housing.

As indicated above, the sampler housing extends substantially vertically throughout the length of the reaction vessel and traverses each of a plurality of catalyst beds, say four. Further, in accordance with the preferred form of the invention the upper end of the sampler housing is open to the vessel at a point above the topmost catalyst bed so that the highest pressure in the vessel can be applied to the upper ends of both the housing and the probe. This high pressure in the vessel is used so that when the discharge ports in the probe and in the external housing are in register, at least a portion of the pressure difference between the reaction vessel and atmospheric conditions can be used to expel the particles trapped in the probe. This is done by providing ports in the upper end of the probe that register with a pressure supply line connected to the upper end of the probe tube. By this arrangement, a catalyst sample can be forced out of the probe even if the highest vessel pressure is at the bottom or the vessel is horizontal rather than vertical.

In said preferred form of the invention, pressure is also used to prevent binding between the probe and the tube forming the housing due to catalyst "fines" (flakes of broken catalyst beads) becoming lodged between the moveable probe and the stationary housing. With a sampler approximately 80 feet in length, an outside diameter of about 1½ inches and a probe member with a diameter of about one inch, the probe and housing must have sufficiently close fit to pressure isolate the vessel from the external or discharge ports. The probe member includes a plurality of spaced-apart bearing members or collars that extend above and below each intake port at each catalyst level. The portions of the probe between the bearing members are then radially spaced from the enclosing tube to reduce friction and thereby permit free longitudinal motion between housing and probe even when fines are present in this space. To control pressure drop through the space between tubing and probe, the radial bearing areas of the collars adjacent each port vary in area with the upper collars having greater bearing area for the probe than the lower collars.

Further objects and advantages of the present invention will become apparent from the following detailed description taken in conjunction with the accompanying drawings which form an integral part of this application.

In the drawings:

FIGURE 1 is a schematic view illustrating a catalyst sampler adapted to withdraw particles from any of four beds in a vertically elongated reaction vessel and illustrates a preferred form of piping circuit to withdraw particles from the sampler.

FIGURES 2A, 2B, 2C, 2D, 2E and 2F are vertical cross sections in ascending order to illustrate adjacent sections of the catalyst probe from the discharge end to the top of the unit. FIGURE 2A specifically shows the external and discharge section of the sampler; FIGURE 2B shows the portion of the sampler that passes through the lower end wall of the reaction vessel; FIGURE 2C shows a portion of the sampler at the lowermost catalyst bed; FIGURE 2D shows part of the sampler at the next-to-lowest catalyst bed; FIGURE 2E shows part of the sampler at the third stage; and FIGURE 2F shows a portion of the upper end of the sampler and the intake ports at the topmost bed.

FIGURE 3 is a partial cross-sectional view of the structure of the reaction vessel, and in particular, shows a typical arrangement of openings through one bed in a reaction vessel.

FIGURE 4 is a partial cross-sectional view at the upper end of the catalyst sampler and shows a preferred form of the pressure applying system for positive ejection of catalyst from the sampler chamber.

Figure 1:
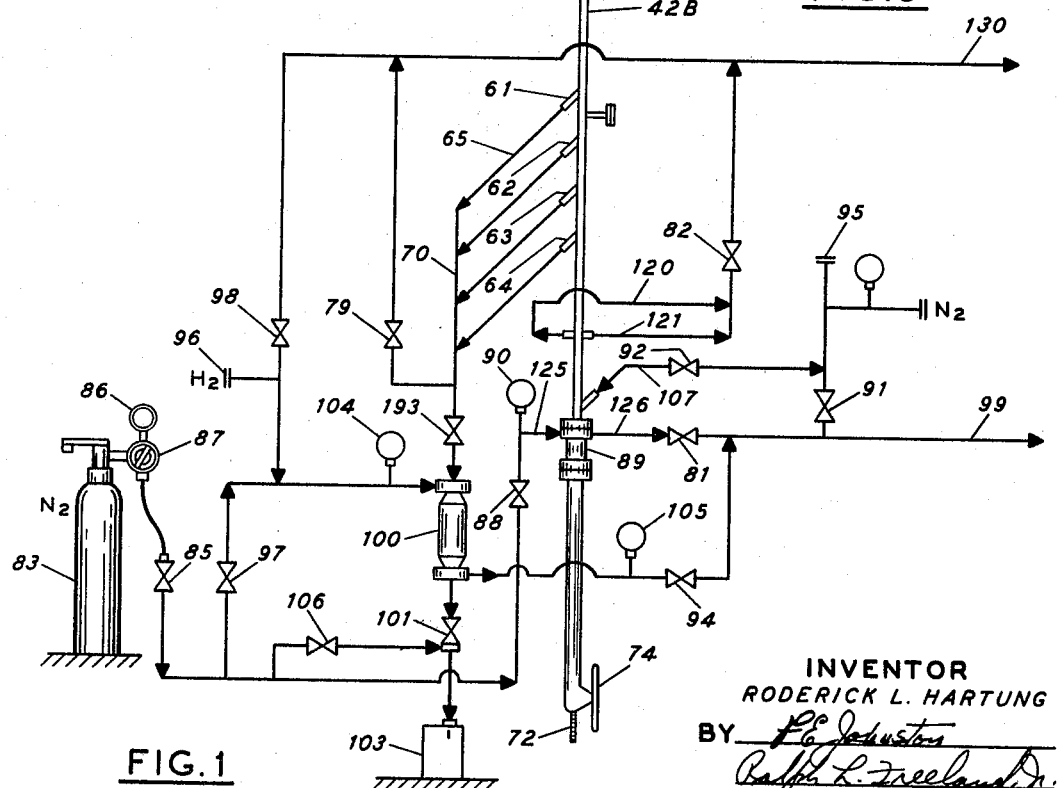

Referring now to the drawings, and in particular to FIGURE 1, the sampler 40 is shown in an elongated reaction vessel 10 that comprises generally a cylindrical housing 12 closed by elliptically-shaped headers or end walls 14 and 16. Such a reaction vessel usually includes an inlet line 18 for feed stock and outlet line 20 for withdrawing converted or reacted product. The vessel, of course, may include inlet and outlet lines at any of the four catalyst beds 22, 24, 26 and 28, but in the present embodiment it is shown in a vessel having a "smooth shell" design, i.e., the only connections to the vessel are through headers 14 and 16.

For simplicity, reaction vessel 10 is shown to comprise only the four stationary beds wherein catalyst particles are supported on a screen 30 (see FIGURE 3) so that hydrocarbon fluids may pass through the bed, and after reacting therewith, either pass up through space 32 to screen 30 of the next higher bed, or down into vapor space 32 above the next lower catalyst bed, dependent upon the direction of flow through vessel 10. In the form shown in FIGURE 1, fluid flow is assumed to be downward so that the highest pressure in vessel 10 is at top header 14.

Figures 2A, 2B:
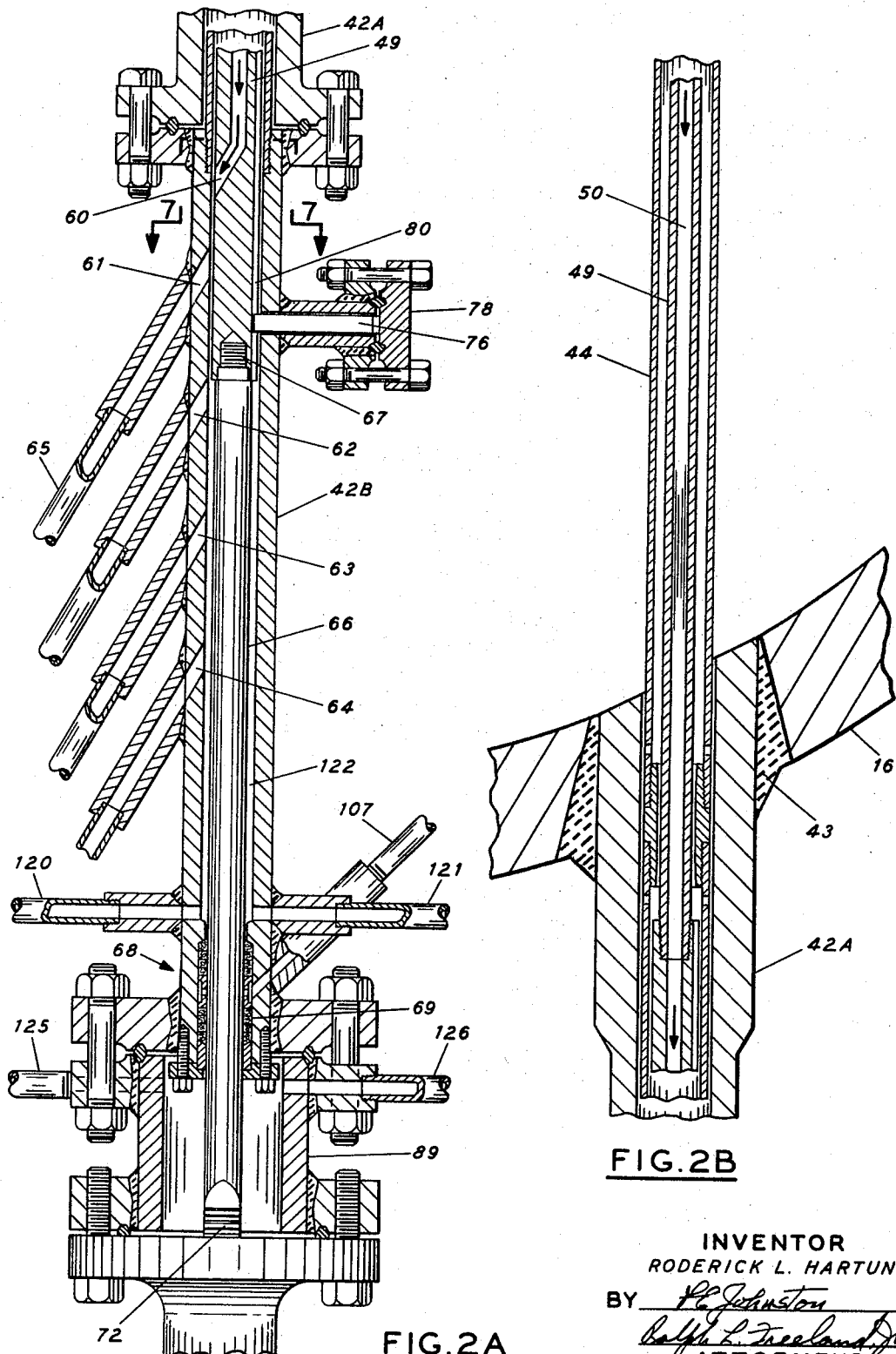

As indicated above, the catalyst in each of the beds 22, 24, 26 and 28 in this type of operation is stationary and is expected to operate for many hundreds of hours before it is regenerated, or replaced. However, vessel 10 is usually constructed of steel several inches in thickness so that it can operate at pressure and temperature conditions that will react the hydrocarbons in the presence of the catalyst. The vessel is, of course, completely closed to atmospheric conditions. The individual beds are subjected to change particularly due to slight amounts of contaminants, such as trace metals, or other abnormal operating conditions (e.g., temperature), that may occur in one bed while those in the other beds are quite unaffected. For this reason it is important to be able to selectively withdraw samples from any one of the multiple beds without affecting the operating conditions in that bed. The sample must also represent the condition of particles in that bed. As shown, catalyst sampler 40 extends through each of the multiple beds 22, 24, 26 and 28, as well as lower end wall 16, and is pressure sealed to external housing 42A. Weld 43 forms this pressure sealing connection between housing 42A and end wall 16 (FIGURE 2B).

Parts of sampler 40 that extend through the multiple catalyst beds are best seen in FIGURES 2C to 2F, inclusive, which are vertical cross-sectional views taken successively from just below the lowest sampling level to the top of probe 40. As best seen in these views, probe 40 comprises an outer housing 44 that includes successive sections of tubing 45 joined together by collars 46. Collars 46 desirably have the same external diameter as tubing pieces 45 so that the entire length of probe 40 has a substantially constant external diameter. Collars 46, however, differ in length and specifically extend above and below the port openings 48 at the four different levels in catalyst beds 22, 24, 26 and 28 (FIGURE 1). Additionally, each collar 46 has an internal diameter so that at least part of its inner diameter forms bearing surface for internal tubing 49.

Figures 5, 6, 7:
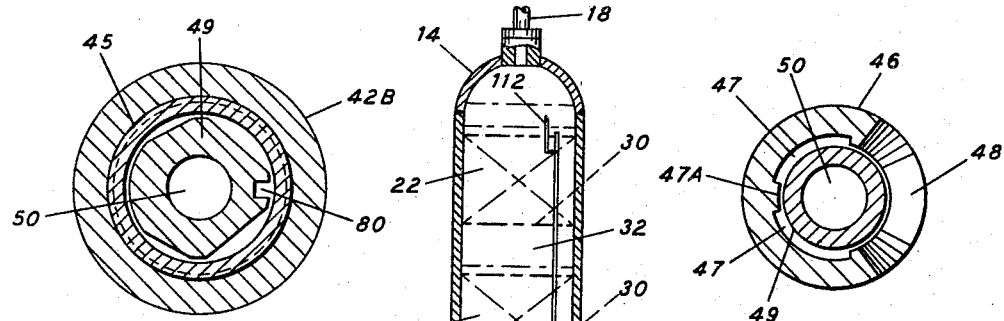
FIGURE 5 is a cross-sectional view taken across one of the intake ports, and specifically shows a section across the sampler in the direction of arrows 5—5 in FIGURE 2D.
FIGURE 6 is a cross-sectional view, similar to FIGURE 5, taken across a higher intake port in the sampler and in the direction of arrows 6—6 in FIGURE 2E.
FIGURE 7 is a sectional view across the sampler in the direction of arrows 7—7 in FIGURE 2A.

FIGURES 5 and 6 respectively show that the internal diameter of each collar is undercut, as at 47, to form bearing lands 47A. Undercuts 47 permit gas to flow between housing 44 and tubing 49 to keep catalyst fines swept out of housing 49. To control this gas flow, it will be noted that the flow path in FIGURE 6, taken across a higher part of probe 40, has a smaller area than in FIGURE 5. This assures downward flow of the catalyst fines. It also assures that the pressure adjacent each port 51 will be lower than the vessel pressure at that level. Thus, catalyst particles will not be blown out of instead of falling into, probe 50.

Tubing 49 forms the probe member and an enclosing chamber 50 that will receive and hold a sample of catalyst. As indicated, tubing 49 is substantially uniform in diameter and may be formed in one piece. But, as indicated specifically in FIGURE 2E, probe member 49 is best formed as tube sections 49A connected together by couplers 49B. These couplers are, of course, located between collars 46 so that probe member 49 can be moved longitudinally without interference between collars 46 and couplers 49B.

Intake ports 51 in probe tubing 49 are, in each case, enclosed within bearings 46 so that there is a fluid pressure control seal between housing 44 and probe member 49 when ports 51 are out of engagement with the intake ports 48 in housing 45. Desirably the edges of ports 51 are sharp enough to shear particles when probe 50 is moved in bearings 46.

FIGURE 2F illustrates the top end of probe member 49 positioned in housing 45 to admit a catalyst sample into the chamber 50 from the topmost bed 22 (FIGURE 1). The opening from ports 48, as best seen in FIGURES 5 and 6, is approximately 120° around the circumference of housing 45. Preferably, the opening is located near the center of the catalyst bed but sufficiently below the top of the bed so that the weight and pressure of the overlying catalyst will force the particles to enter port 48 and flow freely through intake port 51 to substantially fill chamber 50, of probe member 49. The exact dimensions of the probe 40 and the openings 48 and 51 will, of course, be proportioned to the largest diameter of the particles that are to be sampled so the particles will not "bridge" the opening and fail to enter chamber 50.

As indicated before, probe member 49 moves vertically within housing 44 and is successively moved, as desired, so that each of the four openings 51 will register with its selected one of the corresponding four openings 48 at any one of the four levels. Since both the housing and the probe member are unusually long compared to their diameter, both members would be subject to buckling forces if unsupported throughout their lengths. FIGURE 3 illustrates a typical example of the manner in which the external housing can be supported in its run through the entire length of a reaction vessel. Specifically, FIGURE 3 indicates that probe 40 can pass through the chimney trays in the vessel indicated by the assemblies 53 and 54. A tube 56 on a quench tray 54, for example, may be provided with a bearing plate 57 that surrounds and laterally stabilizes probe 40. Where probe 40 enters a catalyst bed, such as 24, a mounting flange 58 is formed as an integral part of the screen support 30 for the catalyst particles. The vessel supports of sampler probe 40 are of course modified to suit the internal structure of the vessel.

The internal tubing forming probe member 49, as indicated before, is supported against lateral flexure, or buckling, by collars 46. While some clearance is permitted, as indicated in an exaggerated form in FIGURES 2C to 2F, this clearance in general will be held to a few hundredths of an inch. However, it is essential that there be reasonable clearance between collars 44 and the side wall of tubing 49, since in hydrocarbon conversion processes using catalyst particles, catalyst frequently includes a "dust" or "fines" of the particles that are created by abrasion between the particles and their support. It is usually undesirable to screen out fine particles from the generally spherical or bead-like particles. For this reason, it is important that there be sufficient clearance in the space between tubing 49 and collars 46 so that the fine particles can be accommodated or dislodged without interfering with the operation of the sampler. The positive blowdown system for catalyst particles in chamber 50 and the space between probe 49 and collars 46 will be described below.

As best seen in FIGURE 2A, probe member 49 has a single discharge port 60 at its lower end that can be brought into registry with any of the four discharge ports 61, 62, 63 and 64 in housing 42B, formed as an outward extension of tubing 44.

Longitudinal or sliding movement of probe member 49 within housing 42B is produced by shaft 66. This shaft is screwed into the end of probe member 49 by thread 67. Shaft 66 also extends out of the lower end of housing 42B through a shaft seal arrangement, indicated generally as 68. Seal 68 includes a packing gland 69 and a purge chamber 89 that permits removal of combustible fluid that may leak through gland 69. The lower end of shaft 66 is threaded as indicated at 72. These threads are engaged by a worm gear (not shown), that is rotatable by handwheel 74 (FIGURE 1). Key 76 mounted in housing 78 prevents rotation of shaft 66 and probe member 49. Key 76 engages keyway 80 in probe member 49, best seen in FIGURE 6.

The foregoing is a description of the essential elements of the multibed catalyst sampler. Removal of a sample from a selected bed is accomplished in the following manner. Because reaction chamber 10 may be operating under conditions where escape of any reaction product or reacting materials could cause fire, explosion, or a health hazard, it is important that precautions be taken to prevent the scape of such materials if the packing or the operating elements become worn or misadjusted so that vapors can escape. For this purpose, as shown in FIGURE 1, a purge system permits the external parts of the sampler to be purged with nitrogen, or other non-explosive gases. Additionally, the system includes a plurality of pressure gauges that permit pressure checks on various parts of the system to assure that no leakage is occurring from the reactor to the operating parts of the sampler. As indicated schematically, bottle 83 supplies nitrogen through suitable piping and valve 85 under the control of a pressure regulator 87 and indicating gauge 86. The most likely point of leakage for the system is around packing 69. To check that there is no leak, valve 81 is opened to relief line 99, and then valve 88 is opened to permit nitrogen to flow through purge chamber 89. After purging for several minutes, these three valves are closed. Then with all other valves closed, the pressure is noted on gauge 90. If there is no appreciable build up at gauge 90 for a period of, say, five minutes, it is then known that packing 69 is not leaking excessively and that it is safe to proceed with the sampling operation.

Probe member 49 is then actuated by handwheel 74 to raise or lower shaft 72. The lower end of shaft 72 will be suitably marked to indicate the position of probe member 49 within housing 40. This assures that each intake port 51 registers with its associated port 48 at any of the desired catalyst levels. As indicated in FIGURES 2F and 2A, when intake port 48 in the topmost bed is in register with intake port 51 in probe member 49, discharge port 60 is above and out of register with any of the four discharge ports 61, 62, 63 and 64. After a suitable time for catalyst to flow into chamber 50 and to fill the entire chamber, or at least receive a reasonable volume of sample, handwheel 74 is again turned to lower shaft 72 and to bring discharge port 60 into engagement with discharge port 61. This vertical movement of probe member 49, of course, disengages port 51 at the upper level from communication with port 48. At the same time, of course, the other three intake ports 51 are also out of engagement with their respective intake ports 48. It will also be seen that at an intermediate point the sample within chamber 50 is isolated from both the reactor and from the discharge port 61. Discharge from port 61 is through an associated flow line, such as 65, into header line 70. From header 70, sample is then admitted to a sample bottle 100 through valve 93.

To assure that all sample particles enter chamber 100, valve 94 is opened to permit reactor gases to pass through the probe member from the topmost part of reactor vessel 10 and through chamber 50. In this way all of the sample within the chamber will be forced into bottle 100. The arrangement forming the inlet portion of the blowdown system is best seen in FIGURES 4 and 2F. As seen in FIGURE 2F the upper end of chamber 50 includes four blowdown ports, indicated as 59. One of these ports registers with gas supply line 110 when discharge port 60, at the bottom of probe 49 (FIGURE 2A), registers with one of the exit ports 61, 62, 63 or 64. As indicated in FIGURES 1 and 4, line 110 is connected to the highest pressure in vessel 10. In FIGURE 4 it is shown connected to riser pipe 112 that terminates at a level above the topmost bed in reactor 10. As also indicated tubing 110 is connected through collar 46 to permit the high gas pressure to cause flow through the space between housing 44 and tubing 49.

Termination of riser pipe 112 may be within a chimney 114. Pipe 112 is then closed by end plug 116 so that only gas flows through ports 118 in the upper end of pipe 112. By this provision of a gas passage through pipe 112, tubing 110, ports 59, chamber 50, discharge port 60 in probe member 49, a discharge port, such as 61, and outlet line 65 and header 70, gas under pressure from reactor 10 purges a catalyst sample from chamber 50. This gas also sweeps the sample collected in bottle 100 and then exhausts through relief line 99 by way of valve 94. At the end of the desired purge period, valve 193 is closed and the sample withdrawn through valve 101 into a sample receiver 103.

If it is desired to cool the catalyst sample 100 after it is withdrawn, connection 96 permits a bottle of hydrogen gas to be connected to and through chamber 100. Valve 94 also controls the flow of such gas. To assure that the pressure across chamber 100 is the same, gauges 104 and 105, respectively, measure pressure at the top and bottom of chamber 100. When hydrogen is connected to the system it is desirable that a small amount of nitrogen be supplied to the system at the same time so that hydrogen will not build up in the lines. Valve 106 permits nitrogen to be added to the catalyst discharge from valve 101 when the sample is admitted to receiver 103. For this purpose it may be desirable to purge receiver 103 with nitrogen before and after the sample is withdrawn from bottle 100.

Since it may be necessary to lubricate packing 69 under pressure, line 107 can be opened through valve 92 to a high pressure lubricating fitting 95.

To assure that catalyst fines do not build up between probe 49 and tubing 44 or between shaft 66 and external housing 42B of the sampler unit, these spaces are connected by valves 79 and 82 to relief line 130. Line 130 in turn is either exhausted to the air at a remote location or the effluent gas used in another system operating at a lower pressure than the outlet of vessel 10. To perform this function valves 79 and 82 are normally left open when catalyst samples are not being taken from vessel 10, but closed during sample taking. This system of lines 120, 121 and 130 thus provides a positive blow down of catalyst fines around the probe unit. The increasing area between housing and probe for gas flow (and particles) from top to bottom in the sampler also greatly aids in sweeping fines from the system.

While only a single embodiment of the present apparatus has been shown for removing catalyst from any bed of a plurality of catalyst or particle reaction beds in a reactor, it will be understood that modifications and changes can be made in both the apparatus and the system for operating said apparatus, without departing from the scope of the appended claims. All such modifications are intended to be included therein.

I claim:

1. Apparatus for selectively sampling a plurality of catalyst beds spaced apart in an elongated reaction vessel comprising an elongated tube extending upwardly through said reaction vessel and passing through said plurality of catalyst beds,
   said tube having at least one port in the side wall of said tube at each of said spaced beds,
   means securing said tube to an end wall of said reaction vessel and forming a pressure-tight connection between the external and internal walls of said vessel through said ports in said tube,
   an elongated probe member extending longitudinally through substantially the length of said elongated tube and extending beyond the walls of said vessel,
   said probe having a plurality of port members within said vessel, and each movable selectively into engagement with one of said plurality of tube ports,
   at least one other port member in said probe member extending beyond the end wall of said vessel,
   said probe member being movable longitudinally relative to said elongated tube selectively to bring one port in said probe member into communication with a port in said tube to admit a sample of catalyst from one of said separated beds into said probe member,
   a housing member surrounding said extension of said probe member beyond said walls of said vessel and in pressure-sealed engagement therewith,
   a plurality of unloading ports formed in the side wall of said housing member adapted to be brought into communication with said other port in said probe by longitudinal movement of said probe,
   each of said unloading ports being adapted to be successively engageable with said other port in said probe by movement thereof,
   each of said unloading ports being closed when catalyst is being admitted by engagement between the ports in said tube and said probe in said vessel to prevent disturbance of the pressure in the bed under sampling, but being open to communication with said probe when said ports in said tube and said probe are out of engagement in said vessel,
   whereby samples of said catalyst from each of said plurality of beds may be withdrawn under the temperature and pressure conditions existing in said beds.

2. A sampler for selectively removing particles from a plurality of levels in an elongated reaction vessel comprising an elongated hollow probe member adapted to extend through said plurality of levels with one portion thereof extending externally of said reaction vessel,
   said probe member having an intake port at each of said levels and at least one discharge port in said portion external to said reaction vessel,
   an enclosing tubing surrounding said probe member, said tubing being sealed to said vessel to form a pressure seal around said probe,
   an opening in said tubing at each of said levels adapted to register with a complementary one of said intake ports in said probe member and said tubing having a plurality of unloading ports in the portion of said tube external to said vessel that are adapted to register with said one discharge port in said probe member,
   means for longitudinally moving said probe member relative to said tubing, said longitudinal movement being adapted to bring one of said intake ports at a selected level in said probe member into engagement with said opening in said tubing when said one discharge port is out of register with any of said unloading ports in said tubing, and after longitudinal movement, where all of said ports in said probe member and said tubing are out of register to isolate a sample taken into said probe member,
   said one discharge port in said probe member registers with one of said plurality of unloading ports in said tubing so that a sample of said particles from one of said plurality of levels may be withdrawn under the operating conditions then in existence in said reaction vessel without upsetting the operating conditions in said vessel.

3. Apparatus in accordance with claim 2 with the addition of means for applying at least a portion of the pressure difference between said reaction vessel and atmospheric conditions to expel particles in said probe member when said one discharge port in said probe member is in registry with one of said unloading ports in said tubing to assist in the removal of said particles from said probe to an external sample collector interconnected to one of said unloading ports in said enclosing tubing.

4. A sampler in accordance with claim 2 wherein said probe member includes spaced-apart bearing members extending above and below said intake ports at each of said levels, and the portions of said probe between said bearing members being spaced radially to said enclosing tubing to reduce the friction to longitudinal motion of said probe member within said tubing.

5. A sampler in accordance with claim 4 in which said spaced-apart bearing members are formed with at least portions of their circumferential bearing surfaces greater in diameter to form gas passageways therethrough and said passageways in said bearing members being greater in size at the low pressure end of said probe than the high pressure end to assist in the removal of particle fines between said probe member and said tubing.

6. A sampler in accordance with claim 5 with the addition of flow lines connected to said tubing below said unloading ports and valve means to control flow of gases through said lines to regulate the withdrawal of particle fines between said probe member and said tubing.

References Cited by the Examiner

UNITED STATES PATENTS

| 800,819 | 10/1905 | Platt | 73—421 |
|---|---|---|---|
| 2,516,097 | 7/1950 | Woodham et al. | 73—421 |
| 3,129,590 | 4/1964 | Ellis | 73—423 |

FOREIGN PATENTS 874,515   4/1953   Germany.

LOUIS R. PRINCE, *Primary Examiner.*

S. C. SWISHER, *Assistant Examiner.*